May 7, 1940.   O. M. BURKHARDT   2,200,151
SEAL CONSTRUCTION
Filed Nov. 1, 1937

INVENTOR.
OTTO M. BURKHARDT.
BY
ATTORNEYS.

Patented May 7, 1940

2,200,151

UNITED STATES PATENT OFFICE 2,200,151

SEAL CONSTRUCTION

Otto M. Burkhardt, Cleveland, Ohio, assignor to Thompson Products, Inc., Cleveland, Ohio Application November 1, 1937, Serial No. 172,312

2 Claims. (Cl. 286—7)

This invention pertains to the art of packless water pumps and the like and relates particularly to an improved sealing means therefor, the present invention constituting an improvement upon that contained in the co-pending application of Colwell et al., Serial No. 82,987, filed June 1, 1936, now Patent No. 2,154,199, issued April 11, 1939.

As more fully explained in the above-cited application, there has heretofore been experienced considerable trouble with the packing glands which have been arranged around the rotating shafts of water pumps and compressors to prevent leakage; and it has been the aim of inventors and manufacturers of packless pumps to overcome the defects that are incident to the use of packing glands.

Experience with packless pumps, which have been designed to overcome such defects, has however revealed other serious defects, especially in the application of seals to water pumps as used with internal combustion engines and machine tools. For instance, in pumps of this type, it is usual practice to use suitable flexible washers which have plain surfaces intended for permanent sealing engagement with other parts upon both sides thereof. But owing to the unevenness of the plain surfaces of these flexible washers, a good seal can be ensured only by application of appreciable pressure to such surfaces between which there is relative rotative engagement; whereas, on the other hand, the pressure exerted upon these contacting surfaces should be extremely light in order to avoid wear as much as possible.

It is therefore the object of this invention to devise a packless seal in which the rotatably engaging surfaces are subjected to only normal pressure so as to keep wear therebetween down to a minimum.

More specifically, this object is accomplished by providing magnified sealing pressure between non-rotating surfaces which, accordingly, are not subject to wear from rotatable engagement.

A further object is to provide such a device with a plurality of such sealing surfaces, thereby reducing still further the danger of leakage through the seal.

Another object consists in devising such a seal in which the metallic or other hard elements thereof can be employed with plain engaging surfaces, so as to simplify the construction of these parts.

Still another object is to provide such a device in which there is required no sealing against the surface of the rotating shaft, so that any rocking of the shaft resulting from wear of the shaft or its bearings, will not interfere with the functioning of the sealing surfaces which are independent of the shaft.

Another object is to devise such a seal which affords insulation against transmission of vibration and noise.

Other objects will appear from the following description and claims when considered together with the accompanying drawing.

Figure 1:
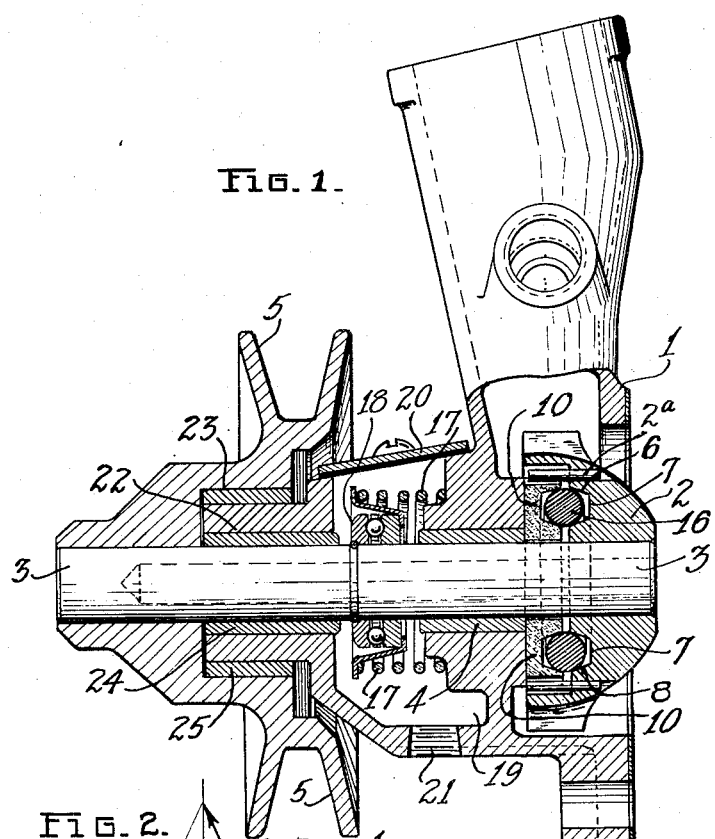
Fig. 1 is a view mostly in section illustrating my improved seal assembly.

It is to be understood that the present form of disclosure is merely for purposes of illustration and that there may be devised various modifications without departing from the spirit of the present invention as herein set forth and claimed.

The present invention is here illustrated in connection with a conventional water pump for an internal combustion engine. The cast iron casing will be recognized as being indicated by reference numeral 1 and the impeller therefor by reference numeral 2. The shaft 3 of the impeller has the bronze bushing 4 for bearing in the pump casing and has the operating pulley 5 provided upon the other end thereof and a bearing means at this point also for the shaft and pulley, as will be more fully explained. This is the same general assembly as in the above-cited application except for the difference in the seal construction itself. As above indicated, the specific form of seal, as herein set forth, constitutes the invention in the present case.

The impeller body is provided with an annular groove which, in the present illustration, is shown as having three flat portions 6, 7 and 8. The two side portions 6 and 8 are inclined inwardly towards the middle or bottom portion 7. The sides 6 and 8 bear angular relation to the longitudinal axis of the shaft 3, and the bottom portion 7 is substantially normal thereto. This groove does not extend to the edge of the impeller body but there remains the marginal flat portion 9 inside and outside the groove, the portions 9 being normally at ninety degrees to the axis of the shaft 3.

The annular sealing member 10, which may be made of hard carbon for example, has flat surface engagement with the correspondingly formed end of the casing 1 and the bushing 4. Relative rotative movement is permitted between sealing member 10 and the casing 1, and these engaging surfaces extend in a plane normal to the axis of shaft 3.

The sealing member 10 is formed with a groove like that in the impeller body and comprises the inclined flat side portions 12 and 13 and the middle or bottom flat portion 14, all of which preferably bear the same angles as in the case of the groove in the other member. Likewise, the sealing member 10 has the flat portions 15 between its groove and the edges of the same.

The two grooves just described are to be regarded as being complementary to each other, these grooves together constituting a hexagon in cross-section. It is to be understood, however, that these grooves might be of other specific forms, so long as they function in the manner to be now explained.

Within the grooves there is the circular ring 16 of round cross-section which consists of a flexible material, as for instance synthetic rubber or other such compounds. As indicated in the drawing, the cross-sectional diameter of this ring is slightly greater than the width of the mouth of the grooves in which it seats; and, as a consequence, the ring 16 seats against the sides of the grooves but with a space left between the opposite portions 9 and 15. As indicated, the seal is free of the shaft.

Dowel pins 2a, fixed to the impeller 2, extend into suitable grooves in the friction member 10 which will thus be rotated with the impeller while at the same time there will be permitted sufficient relative movement between the pins 2a and the member 10 to allow the parts to function in the manner herein explained.

As will be seen, there is thus obtained a wedging engagement between the ring 16 and the inclined sides of the grooves, while there is sufficient space for lateral spreading of the ring between the grooved members; and there is also sufficient clearance between the ring and the bottoms 7 and 14 of the grooves to permit free distortion of the ring due to compression of the same between the grooved members for sealing engagement.

Compression of the ring, as just referred to, is produced by the coil spring 17 which abuts at its one end against the casing 1 and at its other end against the ball thrust bearing 18. One race of this bearing abuts against the shaft 3 and turns with the same, the end thrust exerted by the ball bearing race on the shaft, by virtue of spring 17, serving to hold the sealing surfaces at all times in firm contact with each other. This is located within the lubricant reservoir 19 which has the closure 20 and the bottom plug 21.

Referring to the bearings 22 and 23, it will be observed that the bushing 24 for the shaft 3 and the bushing 25 for the operating pulley 26, are located the one within the other.

Some of the same considerations have been taken into account in devising the present sealing construction as in the companion case above noted, as for instance minimum total axial dimension of the pump, ability of the seal to automatically compensate for errors in manufacture and also for clearance without interfering with the sealing effect, as more fully explained in the companion application, supra, to which reference may be had for a more complete understanding of these considerations.

In the present case, special attention has been given to the matter of pressures upon the surfaces between which there is relative rotation, as briefly referred to above. I have improved this condition by arranging the flexible sealing element so as not to be subjected to such rotative movement with respect to the other elements and by employing plain, hard engaging surfaces at the point of relative rotation between the members. In this way, the rotatively engaging surfaces may be made smooth and even so as to permit an effective seal without excessive pressure and consequently without excessive wear.

The requisite flexibility of the joint is provided between members which do not rotate and which may be subjected to the necessary pressure without danger of wear. In other words, the duty of relative rotation is performed between hard surface members with only normal axial pressure, while the function of flexibility is performed between other surfaces that are free of relative rotative movement and may accordingly be subjected to magnified pressure so as to overcome any unevenness which is characteristic of the surface of such a flexible element.

Thus, in my assembly, great pressure is not required between the rotative surfaces while the pressure upon the flexible element may be suitably magnified without any difficulty since the flexbile element is not subjected to rotative movement, with respect to the other elements.

As will be understood, spring 17 will cause a wedging action between the ring 16 and the inclined sides of the grooves, with the result that the pressure between this ring and the groove side walls is suitably magnified, without however causing any increase in the axial pressure between the plain, hard surfaces of the sealing element 10 and the casing body. The pressure between the ring 16 and the side walls of the grooves will be determined by the angular relation of these walls to the longitudinal axis, and it has been found that this pressure will vary according to a formula which will now be explained.

Figures 2, 3:
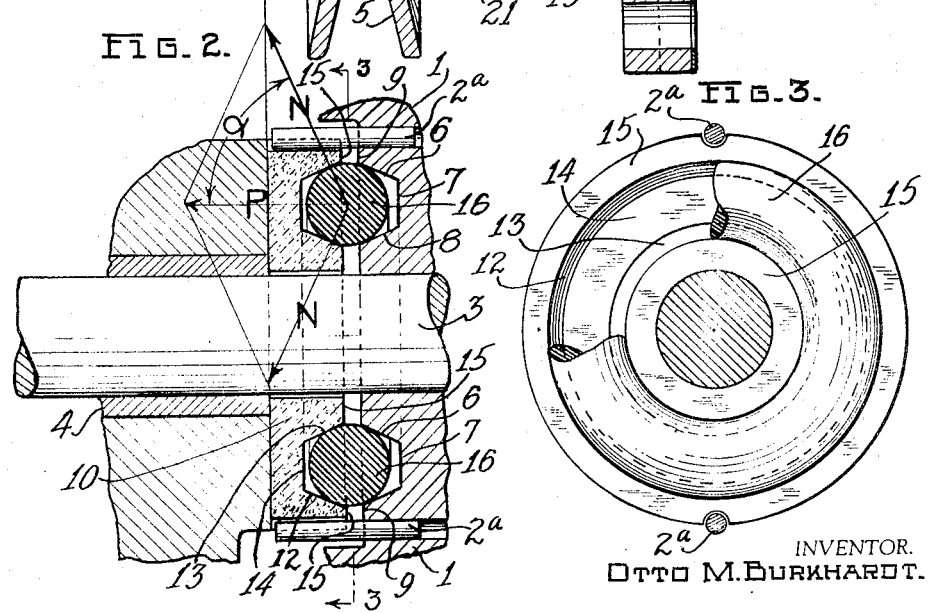
Fig. 2 is an enlarged sectional view of the seal itself.
Fig. 3 is a view taken on line 3—3 of Fig. 2.

Referring to Fig. 2 of the accompanying drawing, the line P extends from the centre of ring 16 and indicates the direction of application of normal axial pressure and thus may be used to represent the pressure between the plain surfaces of the sealing member 10 and the casing body. The line N extends from the centre of ring 16 and at right angle to the side of the groove, and may be used to represent the pressure between the ring and the inclined wall of the groove. Referring to the angle between the lines N and P as $a$, it has been discovered that N varies inversely as the cosine of angle $a$ and there has been deduced the formula $$N = \frac{1}{2} \frac{P}{\cos a}$$

which may be illustrated by supposing an angle $a$ of seventy-two and one-half (72.5) degrees, in which instance the pressure N becomes 2P. That is to say, the pressure P remains normal while pressure N is doubled, and this is true of each of the four regions of engagement between the ring 16 and the inclined sides of the grooves.

Since the pressure is magnified at all of the sealing surfaces—four in the present case—there is realized increased insurance against danger of leak, since if there exists any unevenness because of dirt or other condition at any one of the surfaces so as to permit leak at this point, there still remain the other sealing surfaces to prevent leak through the joint.

With my present invention, there is not required any sealing against the surface of the shaft, as the seal herein provided is sufficient, in and of itself, to prevent leakage to the shaft. This means that even upon wear of the shaft and bearings, the shaft may rock in its bearings but without interfering with the sealing effect inasmuch as the sealing surfaces are entirely independent of the shaft.

Another advantage resulting from my sealing joint, resides in the fact that the flexible connection including the ring 16, constitutes a means of insulation against the transmission of vibration and noise from the impeller. Also, because of this freedom from vibration, the sealing engagement is less apt to leak.

A synthetic product known in the trade as "Neoprene" has been found to be well suited for the sealing ring 16 since this compound is not only resilient but possesses lasting qualities under the conditions of moisture and distortion to which subjected in such a combination and can be readily formed in the shape herein specified. However, this invention is not to be understood as being limited to the use of any particular composition of materials so long as they possess the qualities herein contemplated.

Furthermore, in my present improved form of seal, there are no curved surfaces which have to be formed in the seat for the flexible ring, which fact greatly facilitates manufacture and hence keeps down the cost.

Other advantages will readily suggest themselves to those who are skilled in the art to which the present invention relates.

What I claim is:

1. In a sealing construction, the combination of a housing member, a rotatable shaft member extending therethrough, a sealing means arranged between said housing and shaft members, said sealing means comprising an element having plane rotatable hard surface engagement with one of said members, at least one of the adjacent surfaces of the other of said members and said hard-surfaced element having a polygonal shaped groove therein, a flexible sealing element arranged between the other of said members and said hard-surfaced element and having means for rendering the same non-rotatable with respect thereto and having a curved surface in wedging engagement with the polygonal surfaces, said hard-surfaced element and flexible sealing element being free of engagement with said shaft member, and spring means in addition thereto for maintaining said elements in sealing engagement.

2. In a sealing construction, the combination of a housing member, a rotatable shaft member extending therethrough, a sealing means arranged between said members, said sealing means comprising an element having plane rotatable hard surface engagement with one of said members, the adjacent surfaces of the other of said members and the hard-surfaced element having complementary three-sided grooves therein, with the bottom side of each groove normal to the shaft axis and the grooves together constituting a hexagon shape in cross section, a round flexible sealing element arranged in said grooves and having means for rendering the same non-rotatable with respect thereto and being of a diameter larger than the width of the grooves so as to have a plurality of contacts with each of said grooved members and so as to preserve space between said grooved surfaces and also between the sealing element and the bottoms of said grooves, said hard-surfaced element and flexible sealing element being free of engagement with said shaft member, and means for exerting force co-axially of the shaft so as to effect a wedging engagement of the sealing element with the inclined side walls of the grooves.

OTTO M. BURKHARDT.